US012723627B2

(12) United States Patent
Furuya et al.

(10) Patent No.: US 12,723,627 B2
(45) Date of Patent: Sep. 1, 2026

(54) ELECTROLYTIC CORROSION PREVENTION MEMBER FOR ROLLING BEARING AND ELECTROLYTIC CORROSION PREVENTION ROLLING BEARING UNIT

(71) Applicant: NSK-WARNER K.K., Tokyo (JP)

(72) Inventors: Masatomo Furuya, Shizuoka (JP); Mutsumi Setoi, Shizuoka (JP); Fumimasa Muramatsu, Shizuoka (JP)

(73) Assignee: NSK-WARNER K.K., Tokyo (JP)

( * ) Notice: Subject to any disclaimer, the term of this patent is extended or adjusted under 35 U.S.C. 154(b) by 68 days.

(21) Appl. No.: 18/746,716

(22) Filed: Jun. 18, 2024

(65) Prior Publication Data

US 2025/0129819 A1 Apr. 24, 2025

(30) Foreign Application Priority Data

Oct. 20, 2023 (JP) ................................ 2023-181000
Feb. 28, 2024 (JP) ................................ 2024-028495

(51) Int. Cl.
*F16C 41/00* (2006.01)
*F16C 19/52* (2006.01)

(52) U.S. Cl.
CPC ............ *F16C 41/002* (2013.01); *F16C 19/52* (2013.01); *F16C 2212/08* (2013.01); *F16C 2380/26* (2013.01)

(58) Field of Classification Search
CPC .......... F16C 19/52; F16C 33/78; F16C 41/00; F16C 41/002; F16C 2212/08; F16C 2380/26; H02K 5/16
See application file for complete search history.

(56) References Cited

U.S. PATENT DOCUMENTS

2020/0370597 A1* 11/2020 Bell ...................... F16C 33/205

FOREIGN PATENT DOCUMENTS

CN 113949218 A 1/2022
CN 115664130 A 1/2023
DE 102017210867 A1 1/2019
(Continued)

OTHER PUBLICATIONS

Machine Translation of JP-2002146568-A (Year: 2002).*
(Continued)

*Primary Examiner* — Alan B Waits
(74) *Attorney, Agent, or Firm* — Sughrue Mion, PLLC

(57) ABSTRACT

An electrolytic corrosion prevention member for a rolling bearing, the electrolytic corrosion prevention member being mounted on a rolling bearing unit including the inner ring rotating type rolling bearing in which an outer ring is fixed to a housing and a shaft directly connected to a motor is fitted to an inner ring in order to prevent electrolytic corrosion of the rolling bearing, the electrolytic corrosion prevention member includes: a spring plate including an annular portion and an elastic portion that extends continuously from an inner peripheral side end portion of the annular portion to a center of the annular portion and being formed of a thin plate of a conductive material; and a soft conductive member mounted on a surface of the elastic portion on a side facing the rolling bearing. The soft conductive member is capable of abutting against an end surface of the shaft.

5 Claims, 5 Drawing Sheets

(56) References Cited

FOREIGN PATENT DOCUMENTS

| | | | | | |
|---|---|---|---|---|---|
| DE | 102017222289 | A1 | | 6/2019 | |
| DE | 102020115976 | B3 | | 12/2021 | |
| DE | 102019133881 | B4 | | 4/2022 | |
| JP | 4-8820 | U | | 1/1992 | |
| JP | 9-291943 | A | | 11/1997 | |
| JP | 2002146568 | A | * | 5/2002 | ............ F16C 41/002 |
| JP | 2011-135720 | A | | 7/2011 | |
| JP | 2011-135722 | A | | 7/2011 | |
| JP | 2015-70751 | A | | 4/2015 | |
| JP | 2020-127257 | A | | 8/2020 | |
| WO | WO-2019001869 | A1 | * | 1/2019 | ........... H02K 1/2788 |

OTHER PUBLICATIONS

Machine Translation of W0-2019001869 (Year: 2019).*
Office Action issued on Dec. 10, 2024 by the Japanese Patent Office in corresponding JP Patent Application No. 2024-028495.
European Extended Search Report issued Dec. 20, 2024 by the European Patent Office for EP Patent Application No. 24183264.1.

* cited by examiner

ELECTROLYTIC CORROSION PREVENTION MEMBER FOR ROLLING BEARING AND ELECTROLYTIC CORROSION PREVENTION ROLLING BEARING UNIT

CROSS-REFERENCE TO RELATED APPLICATION(S)

This application is based upon and claims the benefit of priority from prior Japanese patent application No. 2024-028495 filed on Feb. 28, 2024, and prior Japanese patent application No. 2023-181000 filed on Oct. 20, 2023, the entire contents of which are incorporated herein by reference.

BACKGROUND

1. Field of the Invention

The present disclosure relates to an electrolytic corrosion prevention member for a rolling bearing that prevents electrolytic corrosion of a rolling bearing in a rolling bearing unit, and an electrolytic corrosion prevention rolling bearing unit provided with the electrolytic corrosion prevention member for a rolling bearing.

2. Description of the Related Art

In recent years, there has been a progress in practical use of an electric vehicle in which an electric motor serving as a drive source is provided inside or in the vicinity of the wheels to drive the wheels. Such a drive motor is generally called an in-wheel motor. The general in-wheel motor has a structure in which a stator is fixed to a motor housing and a rotor is provided on the inner diameter side of the stator with a gap in the radial direction, and is a so-called inner rotor type motor. As a drive method for the in-wheel motor, a brushless DC motor driven by an inverter is often used in consideration of the performance and the control performance of the motor.

In the method of driving with the inverter, a potential difference occurs between the stator and the rotor due to the parasitic capacitance between the stator and the rotor. This potential difference generates a so-called shaft voltage and shaft current, and when this shaft current passes through the rolling bearing that supports the rotor, a phenomenon called “electrolytic corrosion” occurs that damages the rolling bearing. Specifically, the current flows locally in the contact portion between the raceway surfaces of the outer ring and the inner ring of the rolling bearing and the rolling elements, and the raceway surface or the rolling surface is melted and becomes uneven. This not only roughens the rolling surface and the rolling element surface of the bearing, causing the noise and the vibration, but also affects the life of the bearing if excessive electrolytic corrosion occurs.

In order to prevent the electrolytic corrosion of the rolling bearing, a conductive member is sometimes used. For example, JP2011-135720A and JP2011-135722A propose a conductive member including a contact body that electrically conducts with the rotor of the motor, an elastic body that presses the contact body toward the rotor, and a storage portion that stores the contact body and the elastic body, in which the storage portion is provided in a motor housing and electrically connected to the motor stator via the motor housing.

JP2020-127257A proposes a grounding device in which the distal end portion of a broom-shaped conductive fiber is brought into contact with the outer peripheral surface of a rotating shaft.

Further, JP2002-146568A proposes an electrolytic corrosion prevention device in which an annular seat portion in contact with the end surface of a bearing outer ring is bent into a wave washer shape, an elastic conductor including a contact piece that is extended from the inner side of the annular seat portion and that is in contact with the vicinity of the end surface center portion of the rotating shaft is used, and the surface of the annular seat portion is pressed by the lid-shaped wall of a bearing housing and electrically conducted in the state in which the contact piece abuts against the vicinity of the end surface center portion of the rotating shaft fitted to the bearing inner ring, and in which the annular seat portion is overlapped with the end surface of the bearing outer ring fitted in the bearing housing.

Further, JPH04-8820U proposes that a rod-shaped conductive brush is accommodated in a support hole formed in either one of two bearing rings, the distal end of the conductive brush is biased toward the other bearing ring and is brought into sliding contact with the other bearing ring by the elastic member, and the two bearing rings are electrically conducted.

However, in the technique described above, the abrasion powder generated from the conductive member may contaminate the lubricating oil or the grease composition sealed for lubrication and may damage the raceway surface or the rolling surface. The mating member of the conductive member may be damaged and the abrasion powder may be generated.

Specifically, in JP2011-135720A and JP2011-135722A, the contact body, the elastic body, and the storage body are metal members, and are brought into sliding contact with one another due to the vibration of the motor, so that the metal powder is generated. It is necessary to provide the contact body, the elastic body, and the storage body in the motor housing, and a space therefor is also required.

In JP2020-127257A, the distal end portion of broom-shaped conductive fiber is brought into contact with the outer peripheral surface of the rotating shaft. However, in order to increase the contact area between the distal end portion of the broom-shaped conductive fiber and the rotating shaft as compared to when the distal end portion of the broom-shaped conductive fiber and the rotating shaft are simply brought into contact, the broom-shaped conductive fiber is brought into contact with the outer peripheral surface of the rotating shaft in the state of being bent. That is, since the distal end portion of the broom-shaped conductive fiber is in contact with the outer peripheral surface of the rotating shaft with a relatively strong pressing force, the abrasion powder is generated. At the same time, the outer peripheral surface of the rotating shaft, which is the mating member of the broom-shaped conductive fiber, is also damaged.

In JP2002-146568A, both the elastic conductor and the rotating shaft are made of metal, and the metal powder is generated when the elastic conductor and the rotating shaft come into sliding contact. At the same time, the end surface of the rotating shaft, which is the mating member of the elastic conductor, is damaged.

In JPH04-8820U, since the distal end of the rod-shaped conductive brush is in contact with the other bearing ring in the biased state, the abrasion powder of the conductive brush is generated. At the same time, the other bearing ring, which is the mating member of the conductive brush, is also damaged. Further, it is necessary to form a support hole for accommodating the conductive brush and the elastic member on the bearing ring, and a large load is applied to the bearing ring.

Therefore, the object of the present disclosure is to provide a space-saving and inexpensive electrolytic corrosion prevention member and an electrolytic corrosion prevention rolling bearing unit provided with the electrolytic corrosion prevention member. Accordingly, in addition to preventing the generation of the abrasion powder from a conductive member or the abrasion powder accompanying sliding contact between the conductive member and a mating member, and minimizing damage to the mating member, the electrolytic corrosion prevention member and the electrolytic corrosion prevention rolling bearing unit can be used with the existing bearing without requiring new processing on the bearing and without the restriction on the type of the bearing.

SUMMARY

The above object of the present disclosure is achieved by the following configuration.

According to an aspect of the present disclosure, there is provided an electrolytic corrosion prevention member for a rolling bearing, the electrolytic corrosion prevention member being mounted on a rolling bearing unit including the inner ring rotating type rolling bearing in which an outer ring is fixed to a housing and a shaft directly connected to a motor is fitted to an inner ring in order to prevent electrolytic corrosion of the rolling bearing, the electrolytic corrosion prevention member including: a spring plate including an annular portion and an elastic portion that extends continuously from an inner peripheral side end portion of the annular portion to a center of the annular portion and being formed of a thin plate of a conductive material; and a soft conductive member mounted on a surface of the elastic portion on a side facing the rolling bearing, in which the soft conductive member is capable of abutting against an end surface of the shaft.

A preferred embodiment of the present disclosure related to the electrolytic corrosion prevention member for a rolling bearing relates to the following configurations.

In the above aspect of the electrolytic corrosion prevention member for a rolling bearing, the annular portion may be pressed against a side surface of the outer ring with a spacer interposed therebetween.

Further, in the above aspect of the electrolytic corrosion prevention member for a rolling bearing, the soft conductive member may be made of at least one selected from a resin-impregnated non-woven fabric, a non-woven fabric, a resin-impregnated woven fabric, a woven fabric, a resin-impregnated soft porous body, and a soft porous body.

Further, in the above aspect of the electrolytic corrosion prevention member for a rolling bearing, the elastic portion of the spring plate is bent halfway.

Further, in the above aspect of the electrolytic corrosion prevention member for a rolling bearing, the elastic portion of the spring plate is flush with the annular portion.

Further, the above object of the present disclosure is achieved by the following configuration.

According to another aspect of the present disclosure, there is provided an electrolytic corrosion prevention rolling bearing unit including: an inner ring rotating type rolling bearing in which an outer ring is fixed to a housing and a shaft directly connected to a motor is fitted to an inner ring; and the electrolytic corrosion prevention member for a rolling bearing according to the above aspect.

Hereinafter, the "electrolytic corrosion prevention member for a rolling bearing" is simply referred to as an "electrolytic corrosion prevention member", and the "electrolytic corrosion prevention rolling bearing unit" is simply referred to as a "bearing unit".

The electrolytic corrosion prevention member according to the present disclosure includes a soft conductive member mounted on an elastic portion of a spring plate and abutting against the end surface of a shaft. The biasing force of the soft conductive member to the end surface of the shaft by the spring plate is not fairly strong, and the abrasion powder is less likely to be generated. Moreover, since the soft conductive member is made of a soft material, damage to the shaft that is the mating member is also small.

The electrolytic corrosion prevention member and the electrolytic corrosion prevention rolling bearing unit can be used with the existing bearing without requiring any processing on the rolling bearing and without the restriction on the type of the rolling bearing, and thus the versatility is extremely high. Further, the spring plate is a thin plate, and an increase in space for the bearing unit to be mounted can be minimized.

The bearing unit according to the present disclosure is provided with the electrolytic corrosion prevention member according to the present disclosure. Therefore, generation of the abrasion powder and damage to the mating member are prevented, and further, the bearing unit is highly versatile and does not require an increase in space.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein:

FIGS. 1A to 1C show an example of an electrolytic corrosion prevention member according to the present disclosure, in which FIG. 1A is a plan view thereof, FIG. 1B is a cross-sectional view taken along a line A-A in FIG. 1A, and FIG. 1C is an enlarged view showing a bent portion of an elastic portion in FIG. 1B; 25

DETAILED DESCRIPTION OF THE INVENTION

Hereinafter, the embodiment of the present disclosure will be described in detail with reference to the drawings. The present disclosure is not limited to the embodiment to be described below, and can be implemented by being freely changed without departing from the gist of the present disclosure.

Figure 1A:
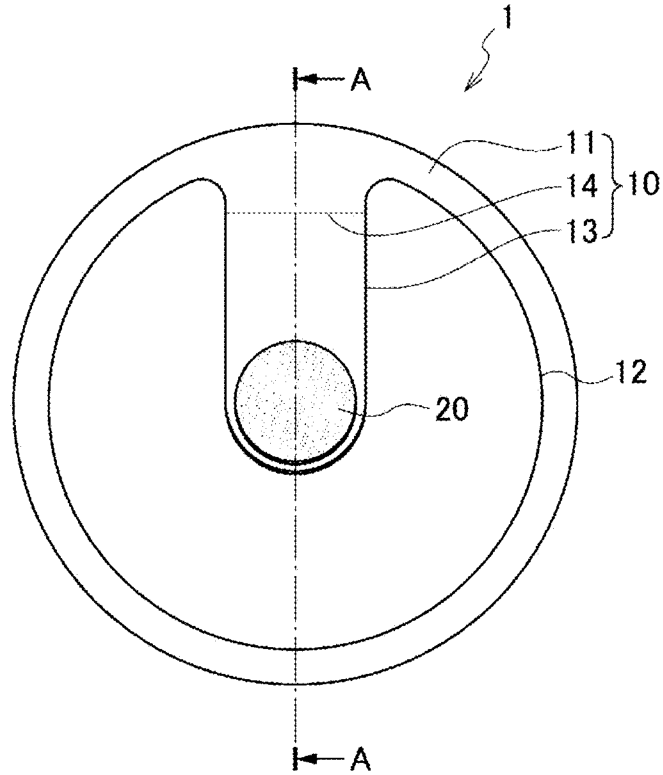
Figure 1B:
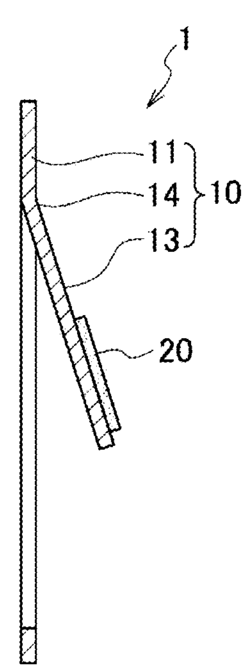
Figure 1C:
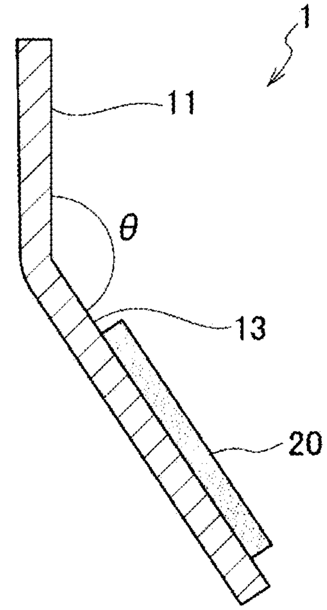
Figure 2:
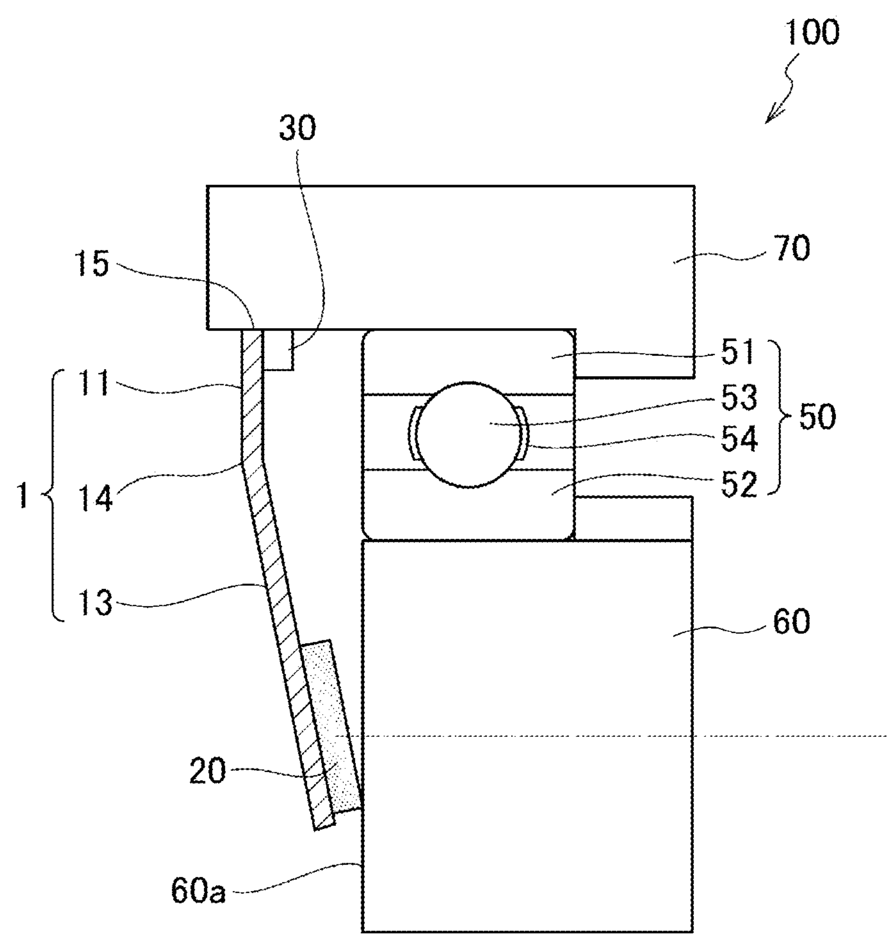
FIG. 2 is a cross-sectional view showing an example of the bearing unit provided with the electrolytic corrosion prevention member shown in FIGS. 1A to 1C.

FIGS. 1A to 1C show an example of an electrolytic corrosion prevention member according to the present disclosure, in which FIG. 1A is a plan view thereof, FIG. 1B is a cross-sectional view taken along a line A-A in FIG. 1A, and FIG. 1C is an enlarged view showing a bent portion between an annular portion and an elastic portion in FIG. 1B. FIG. 2 is a cross-sectional view showing an example of a bearing unit according to the present disclosure provided with the electrolytic corrosion prevention member shown in FIGS. 1A to 1C.

In a bearing unit 100 shown in FIG. 2, there is no limit to the rolling bearing 50, and a plurality of rolling elements (balls) 53 are held between an outer ring 51 and an inner ring 52 in a manner of rolling freely by a retainer 54, and are lubricated with a lubricating oil or a grease composition. Here, the rotating ring is the inner ring 52, into which a shaft 60 directly connected to a motor (not shown) is fitted. The shaft 60 is fitted such that an end surface 60*a* is flush with an end surface 52*a* of the inner ring 52. The outer ring 51 is a fixed ring and is fixed to a housing 70.

As shown in FIG. 1, an electrolytic corrosion prevention member 1 includes a spring plate 10 including an annular portion 11 and one elastic portion 13 extending from an inner peripheral side end portion 12 of the annular portion 11 toward the center of the annular portion 11. As shown in FIG. 2, when the elastic portion 13 is mounted on the bearing unit 100, the elastic portion 13 is bent toward the right side in the figure from an elastic base portion 14 in a manner of facing the end surface 60*a* of the shaft 60 fitted into the inner ring 52 of the rolling bearing 50.

The spring plate 10 is entirely made of a thin plate made of a conductive material such as metal. When the conductive material is metal, stainless steel is preferable because stainless steel is easy to process and is less prone to rust.

At the distal end portion of the elastic portion 13, that is, at the center portion of the annular portion 11, on the surface facing the end surface 60*a* of the shaft 60 fitted into the rolling bearing 50, a soft conductive member 20 is mounted, and the spring plate 10 and the soft conductive member 20 constitute the electrolytic corrosion prevention member 1. The soft conductive member 20 is mounted on the elastic portion 13 using the adhesive.

The soft conductive member 20 is obtained by a soft base material being mixed with or supported on the conductive material. Examples of the soft base material include porous materials such as paper, cloth, and non-woven fabric, and resin sheets. Examples of the conductive material include metal fibers, pulverized materials, and powders of silver, copper, gold, aluminum, and stainless steel, and conductive carbon fibers, pulverized materials, and powders. As the soft conductive member, a commercially available product called a "conductive sheet" or the like can also be used. It is preferable that the soft conductive member is made of, among the materials, at least one selected from resin-impregnated non-woven fabrics, non-woven fabrics, resin-impregnated woven fabrics, woven fabrics, resin-impregnated soft porous bodies such as sponges, and soft porous bodies such as sponges.

As shown in FIG. 1C, a bending angle θ between the annular portion 11 and the elastic portion 13 is appropriately set such that the soft conductive member 20 abuts against the end surface 60*a* of the shaft 60 when the soft conductive member 20 is mounted on the bearing unit 100. By the bending angle θ, the biasing force of the soft conductive member 20 to the end surface 60*a* of the shaft 60 can be adjusted. By decreasing the bending angle θ, the biasing force can be strengthened, and conversely, by increasing the bending angle θ, the biasing force can be weakened.

The planar shape of the soft conductive member 20 is not limited, and may be a rectangular shape in addition to the circular shape shown in FIG. 1A. A plurality of small pieces may be used.

Figure 3:
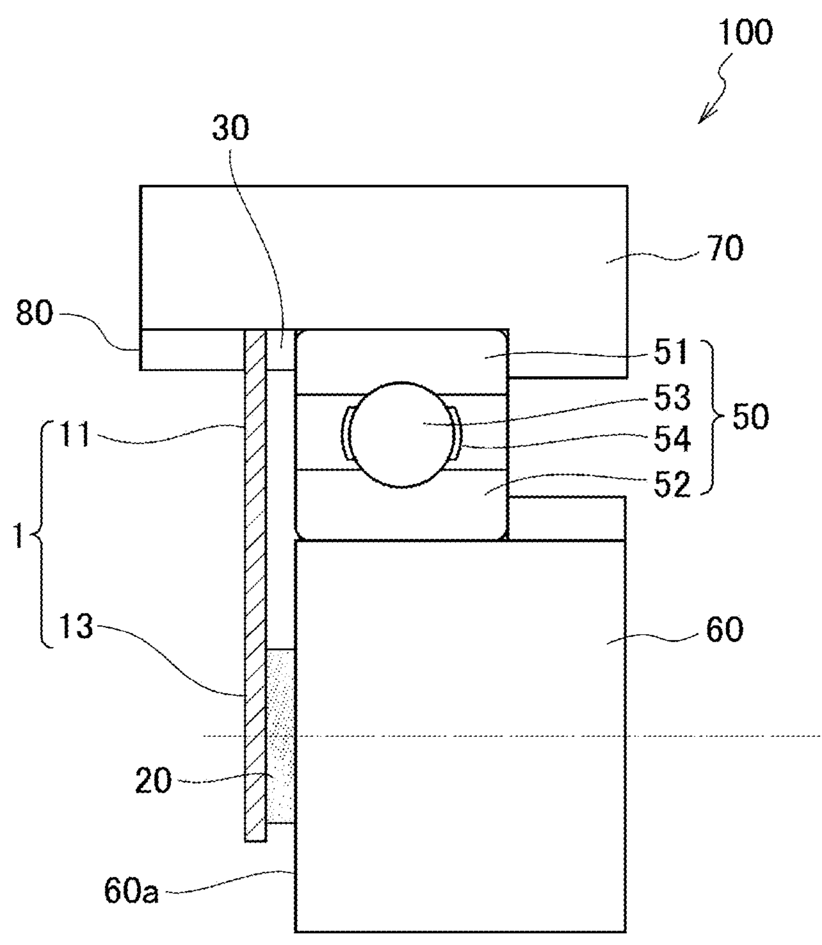
FIG. 3 is a view showing a state in which an electrolytic corrosion prevention member is pressed against an outer ring by a pressing member in FIG. 2.

In the present embodiment, as shown in FIG. 3, the annular portion 11 of the electrolytic corrosion prevention member 1 is pressed against the side surface of the outer ring 51 via a conductive spacer 30 by a conductive pressing member 80. The spacer 30 may have a thickness in consideration of the pressing amount of the spring plate 10A, the thickness of the soft conductive member 20, and the like. The annular portion 11 of the electrolytic corrosion prevention member 1 may directly abut against the side surface of the outer ring 51 without providing the spacer 30.

In such an inner ring rotating type bearing unit 100, the current from the motor normally flows through the shaft 60 to the inner ring 52, and the rolling elements 53 and the outer ring 51 are energized inside the bearing, causing electrolytic corrosion in the rolling bearing 50. Therefore, in the present disclosure, the electrolytic corrosion prevention member 1 is mounted on the housing 70 such that the soft conductive member 20 abuts against the end surface 60*a* of the shaft 60. The annular portion 11 is in electrical contact with the side surface of the outer ring 51 via the conductive spacer 30, and is also in electrical contact with the conductive pressing member 80.

Accordingly, the current from the shaft 60 flows from the soft conductive member 20 to the elastic portion 13 and the annular portion 11 of the spring plate 10, and flows to the housing 70 via an outer peripheral end surface 15 of the annular portion 11, the pressing member 80, the spacer 30, and the outer ring 51. Therefore, no current is applied inside the bearing, and the rolling bearing 50 does not suffer from electrolytic corrosion.

Since the outer ring 51 has a large contact area with the housing 70, the current flowing through the outer ring 51 does not pass through the rolling element 53 and flows into the housing 70.

In the present embodiment, the outer peripheral end surface 15 of the annular portion 11 and the spacer 30 abut against the housing 70. Alternatively, the outer peripheral end surface 15 and the spacer 30 may be held between the outer ring 51 and the pressing member 80 without abutting against the housing 70. In this case, the current flowing through the annular portion 11 flows to the housing 70 via the outer ring 51 and the pressing member 80.

Since the end surface 60*a* of the shaft 60 is in contact with the soft conductive member 20, the shaft 60 is not damaged, and the rotation torque of the shaft 60 can be prevented from decreasing.

Moreover, since the base material of the soft conductive member 20 is a porous body and has the oil absorption property and the oil retention property, the oil film is less likely to form, and the conductivity is good even when the soft conductive member 20 is used in oil. By using the base material of the soft conductive member 20 as a porous body, the friction coefficient can be reduced even when the soft conductive member 20 is used in an environment other than the oil environment, and a reduction in the rotation torque of the inner ring 52 can be prevented.

It is preferable that the soft conductive member 20 abuts against the end surface 60*a* of the shaft 60 near the center portion of the shaft, and since the circumferential speed is low near the center portion of the shaft, the abrasion powder is less likely to be generated.

Further, the spring plate 10 of the electrolytic corrosion prevention member 1 is a thin plate, and an increase in space of the bearing unit 100 can be minimized. Since there is no limitation on the rolling bearing 50 and there is no need to perform any processing, the rolling bearing 50 can be applied to the existing rolling bearing, and the versatility is fairly high.

By increasing the contact area between the soft conductive member 20 of the electrolytic corrosion prevention member 1 and the end surface 60*a* of the shaft 60 of the rolling bearing 50, electrolytic corrosion of the rolling bearing 50 can be more effectively prevented. Since the spring plate 10 is entirely made of a bent thin plate and is an elastic member, by pressing the annular portion 11 of the electrolytic corrosion prevention member 1 toward the outer ring 51, the elastic force due to the pressing acts on the elastic portion 13, the elastic portion 13 is pushed apart such that the bending angle θ shown in FIG. 1C becomes larger, and the entire elastic portion 13 moves toward the rolling bearing 50. Accordingly, the portion of the soft conductive member 20 that is away from the end surface 60*a* of the shaft 60 in FIG. 2 also moves toward the rolling bearing 50, and almost the entire soft conductive member 20 comes into contact with the end surface 60*a* of the shaft 60.

Figure 4:
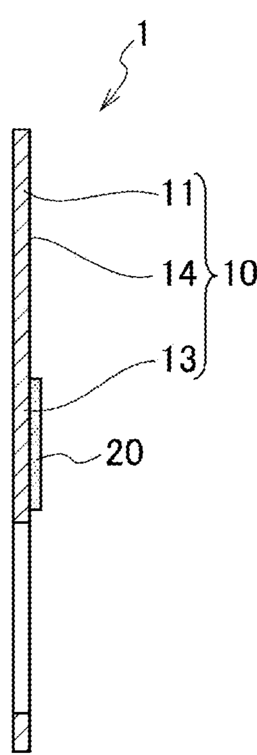
FIG. 4 is a cross-sectional view corresponding to FIG. 1B of a modified example of an electrolytic corrosion prevention member according to the present disclosure.

The present disclosure is not limited to the above embodiment, and may be modified and improved as appropriate. For example, in the present embodiment, the elastic portion 13 of the spring plate 10 is bent halfway, but may be formed flush with the annular portion 11 without bending at the elastic base portion 14. That is, as shown in FIG. 4, the annular portion 11 and the elastic portion 13 are linearly continuous in a side view.

Figure 5:
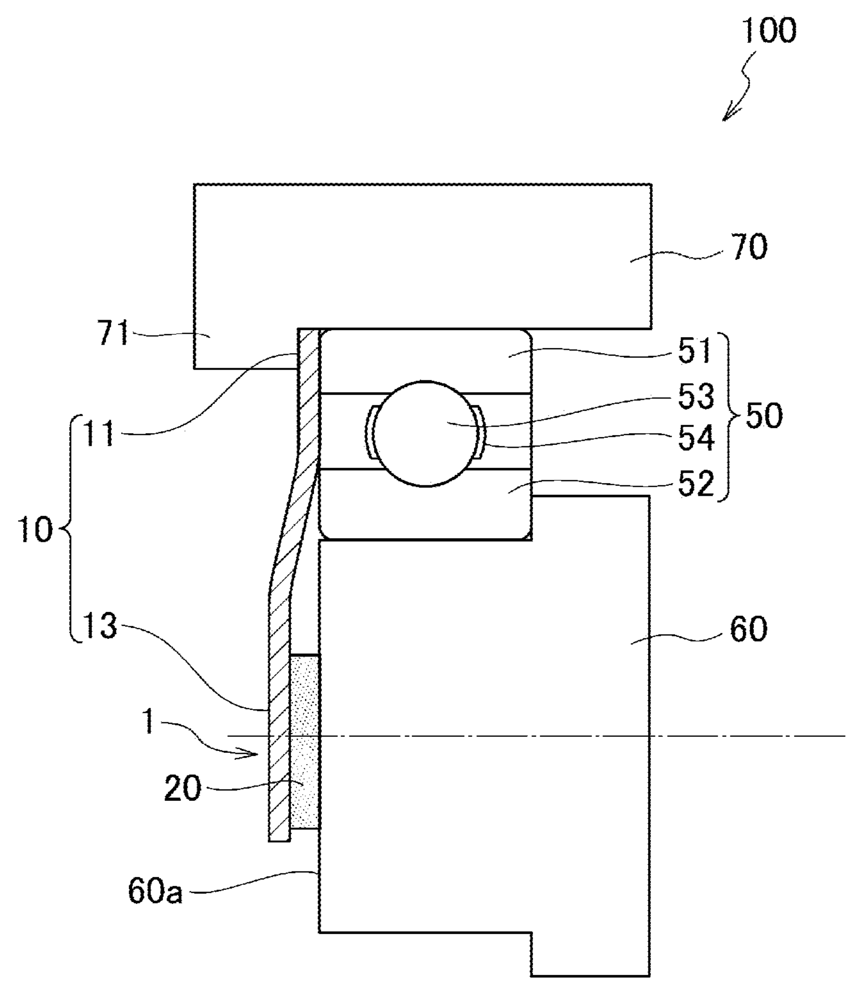
FIG. 5 is a cross-sectional view showing an example of the bearing unit provided with the electrolytic corrosion prevention member shown in FIG. 4.

In the bearing unit 100 shown in FIG. 5, when the annular portion 11 of the electrolytic corrosion prevention member 1 is sandwiched between the flange portion 71 of the housing 70 and the side surface of the outer ring 51, the elastic portion 13 of the electrolytic corrosion prevention member 1 is elastically deformed by the thickness of the soft conductive member 20, and the soft conductive member 20 is brought into contact with the end surface 60*a* of the shaft 60 by the bending reaction force of the spring plate 10. Thus, the same function as in the above embodiment can be achieved.

In this case, since bending of the spring plate 10 is not required, the electrolytic corrosion prevention member 1 can be manufactured inexpensively, and the adhesion between the spring plate 10 and the soft conductive member 20 can be easily performed.

Further, in the present embodiment, the spring plate includes one elastic portion extending toward the center of the annular portion. Alternatively, the spring plate may include a plurality of elastic portions extending in a radial shape toward the center of the annular portion.

The invention claimed is:

1. An electrolytic corrosion prevention member for a rolling bearing, the electrolytic corrosion prevention member being mounted on a rolling bearing unit including the inner ring rotating type rolling bearing in which an outer ring is fixed to a housing and a shaft directly connected to a motor is fitted to an inner ring in order to prevent electrolytic corrosion of the rolling bearing, the electrolytic corrosion prevention member comprising:

a spring plate including an annular portion and an elastic portion that extends continuously from an inner peripheral side end portion of the annular portion to a center of the annular portion and being formed of a plate of a conductive material; and a soft conductive member mounted on a surface of the elastic portion on a side facing the rolling bearing, the soft conductive member being softer than the spring plate, wherein the soft conductive member is capable of abutting against an end surface of the shaft, and wherein the soft conductive member is made of at least one selected from a resin-impregnated non-woven fabric, and a resin-impregnated soft porous body.

2. The electrolytic corrosion prevention member for a rolling bearing according to claim 1, wherein the annular portion is pressed against a side surface of the outer ring with a spacer interposed therebetween.

3. The electrolytic corrosion prevention member for a rolling bearing according to claim 1, wherein the elastic portion of the spring plate is bent.

4. The electrolytic corrosion prevention member for a rolling bearing according to claim 1, wherein the elastic portion of the spring plate is flush with the annular portion.

5. An electrolytic corrosion prevention rolling bearing unit comprising:

the inner ring rotating type rolling bearing in which the outer ring is fixed to the housing and the shaft directly connected to the motor is fitted to the inner ring; and the electrolytic corrosion prevention member for the rolling bearing according to claim 1.

* * * * *